United States Patent
Abburi et al.

(10) Patent No.: US 12,142,050 B1
(45) Date of Patent: Nov. 12, 2024

(54) SYSTEMS AND METHODS FOR ISOLATING FEATURES IN DYNAMICALLY ACQUIRED IMAGE DATA USED FOR UPDATING POLICY DATA

(71) Applicant: United Services Automobile Association (USAA), San Antonio, TX (US)

(72) Inventors: Madhusudhana Rao Abburi, San Antonio, TX (US); Shayla Leigh Callis, Simi Valley, CA (US); Neetu Jain, Coppell, TX (US); Ric M. Pena, Boerne, TX (US); Anto Chirayil Thomas, Coppell, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 371 days.

(21) Appl. No.: 17/514,844

(22) Filed: Oct. 29, 2021

(51) Int. Cl.
| | |
|---|---|
| *G06V 20/52* | (2022.01) |
| *G06N 20/00* | (2019.01) |
| *G06Q 40/08* | (2012.01) |
| *G06V 10/75* | (2022.01) |

(52) U.S. Cl.
CPC ............. *G06V 20/52* (2022.01); *G06N 20/00* (2019.01); *G06Q 40/08* (2013.01); *G06V 10/751* (2022.01)

(58) Field of Classification Search
CPC .......... G06T 7/90; G06Q 40/08; G06Q 20/14; G06V 20/40; G06V 40/10; G06V 10/82; G06V 20/52; G06V 10/751; G06N 20/00; G06N 3/045; G06N 3/02
See application file for complete search history.

(56) References Cited

U.S. PATENT DOCUMENTS

| | | | |
|---|---|---|---|
| 10,062,118 B1* | 8/2018 | Bernstein | G06Q 40/08 |
| 10,121,207 B1* | 11/2018 | Devereaux | G06Q 40/03 |
| 10,453,147 B1* | 10/2019 | Davis | G06Q 40/08 |
| 11,302,034 B2* | 4/2022 | Kozikowski | G06T 7/00 |
| 2018/0089763 A1* | 3/2018 | Okazaki | G06N 3/04 |
| 2020/0334901 A1* | 10/2020 | Upendran | G06T 15/04 |

FOREIGN PATENT DOCUMENTS

| | | | | |
|---|---|---|---|---|
| CN | 111242498 A | * | 6/2020 | |
| WO | WO-2022027015 A1 | * | 2/2022 | ........... G05D 1/0246 |

OTHER PUBLICATIONS

Machine translation of CN-111242498-A (Year: 2020).*

* cited by examiner

*Primary Examiner* — Aaron W Carter
*Assistant Examiner* — Courtney Joan Nelson
(74) *Attorney, Agent, or Firm* — Fletcher Yoder, P.C.

(57) ABSTRACT

A method may include receiving, via a processor, a digitally stitched image representative of a property from a storage component and receiving a model from the storage component. The method may then involve comparing the digitally stitched image to the model to identify one or more features associated with a portion of the property and sending data comprising one or more features to a computing device for presenting via an electronic display. The method may also involve receiving additional data indicative the one or more features from the computing device and generating an altered digitally stitched image based on the digitally stitched image and the portion of the one or more features. Afterwards, the method may update the model based on the altered digitally stitched image and send a notification indicative of the updated model representative of the property to a computing device.

20 Claims, 6 Drawing Sheets

SYSTEMS AND METHODS FOR ISOLATING FEATURES IN DYNAMICALLY ACQUIRED IMAGE DATA USED FOR UPDATING POLICY DATA

BACKGROUND

The present disclosure relates generally to systems and methods for isolating features in dynamically acquired image data used for updating policy data. More specifically, the present disclosure relates to employing image editing technology to isolate features in dynamically acquired image data for updating insurance policies.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Insurance providers may use various techniques and methods to provide competitive property insurance policies for insurance customers. For example, the insurance providers may determine property insurance policies based on data related to the property being insured. However, after the property insurance policy is determined, the insurance customer may remodel or change the property, and the updates to the property may not be adequately covered in existing insurance policies. As such, improved systems and methods for updating an insurance policy for a property are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a storage component and a processor. The processor may receive a digitally stitched image representative of at least a portion of a property from the storage component and receive a model representative of the property from the storage component. The processor may then compare the digitally stitched image to the model representative of the property to identify one or more features associated with the at least a portion of the property and present the one or more features via an electronic display. The processor may also receive one or more inputs indicative of a portion of the one or more features and generate an altered digitally stitched image based on the digitally stitched image and the portion of the one or more features. Afterwards, the processor may update the model representative of the property based on the altered digitally stitched image and send a notification indicative of the updated model representative of the property to a computing device.

In another embodiment, a method may include receiving, via at least one processor, a digitally stitched image representative of at least a portion of a property from a storage component and a model representative of the property from the storage component. The method may include comparing the digitally stitched image to the model representative of the property to identify one or more features associated with the at least a portion of the property and sending data comprising the one or more features to a computing device for presenting via an electronic display. The method may include receiving additional data indicative of a portion of the one or more features from the computing device and generating an altered digitally stitched image based on the digitally stitched image and the portion of the one or more features. Afterwards, the method may include updating the model representative of the property based on the altered digitally stitched image and sending a notification indicative of the updated model representative of the property to a computing device.

In yet another embodiment, a non-transitory computer-readable medium comprising computer-executable instructions that, when executed by at least one processor, may cause the at least one processor to perform operations comprising receiving a digitally stitched image representative of at least a portion of a property from a storage component and receiving a model representative of the property from the storage component. The a non-transitory computer-readable medium may include comparing the digitally stitched image to the model representative of the property to identify one or more features associated with the at least a portion of the property and sending data comprising the one or more features to a computing device for presenting via an electronic display. The a non-transitory computer-readable medium may also include receiving additional data indicative of a portion of the one or more features from the computing device and generating an altered digitally stitched image based on the digitally stitched image and the portion of the one or more features. Afterwards, The a non-transitory computer-readable medium may include updating the model representative of the property based on the altered digitally stitched image and sending a notification indicative of the updated model representative of the property to a computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Some property insurance policies are determined at a particular time for an applicant based on certain information regarding the applicant and a type of coverage that the applicant is seeking. For instance, when determining a property insurance policy for an applicant, a computing system of an insurance provider may analyze features of the property, such as physical characteristics, possessions, location, age, and the like, along with a risk profile (e.g., claim history, credit score, rental history) of the applicant. Using this information, the computing system may generate a property insurance policy to cover the property from damages and a premium rate associated with the property insurance policy.

However, as the applicant adds items to the property, updates the property, or remodels the property, the insurance provider may be unaware of the updates that the existing insurance policy may not provide adequate coverage for the updated property. As such, it is presently recognized that the insurance provider may collect and monitor (e.g., using the computing system) sensor data (e.g., image data) associated with the property to better assess the state of the property and to provide updated insurance policies based on any detected change. For example, a computing system may use sensor data to develop a model representative of the property and continuously collect sensor data over time that may be used to update the model of the property. That is, in some embodiments, the computing system may use the recently collected sensor data to update the model by digitally stitching previously acquired images with more recently acquired images. The resulting model may be compared to a stored model (e.g., 3D representation of property) to determine changes to the property. The computing system may then analyze the updated model to generate an adjusted property insurance policy for the user to cover the additional updates included in the property.

With the foregoing in mind, some applicants may wish to review image data or sensor data collected by the sensors prior to the data being used to update the model. That is, for example, the applicant may wish to protect the privacy of the individuals represented in the image, filter objects presented in the image, or remove certain details from the images collected by image sensors. As such, prior to generating the model of the property, the computing device may solicit information (e.g., sounds, temperatures, images) from the user that may be used to generate the model of the property. In some embodiments, the computing system may identify certain features that are present in the collected data that may be new features that may be added to the model, features that are unrelated to the property and thus not to be included when building the model, or the like. After identifying these features, the computing system may present these features to the user and prompt the user to select the features to be added, removed, or filtered from the collected data. The user's selections may then be used to generate the model of the property. That is, after the user selects certain features to be added or removed, the computing system may update the model to include the added features and ensure that the removed features are not included in the updated model. The updated model may then be used to determine whether an updated insurance policy will be beneficial to the user.

With the foregoing in mind, the computing system may continuously update the model and determine whether the property insurance should be updated based on the collected data over time. However, in order to collect data without prompting a user to obtain certain types of data, the computing system may continuously receive image data regarding the property by having access to the user's image data storage component (e.g., cloud). After a threshold amount of time passes since the time when the existing model is generated, the computing system may use the recently acquired image data to determine the changes that are present in the property. In some cases, the image data may not directly correspond to counterpart image data representative of a certain view (e.g., reference view) of the property stored in a database and used to generate the existing model. That is, the updated image data may be acquired at different angles, during an event where a number of objects (e.g., decorations, guests) obscure certain parts of the image data, and the like. As such, although the image data may be representative of the property, each individual image or video may represent a portion of the reference view of the property. To obtain a more comprehensive view of the entire property, the computing system may digitally stitch the recently acquired images together to create a single image that represents a view in the property that may be used for comparison to the reference view. By comparing the digitally stitched images with the reference view, the computing system may identify new features within the property, prompt the user to select a subset of the new features to include in the model, and update the model accordingly. Moreover, the computing system may update the model without prompting the user to obtain image data that matches previously acquired image data or requests input data from the user. Instead, the computing system may discreetly monitor the property via the acquired image data.

Then, the computing system may analyze the updated model to adjust the property insurance policy. As such, the computing system may generate a better suited property insurance policy for both the insurance provider and the insurance customer.

Figure 1:
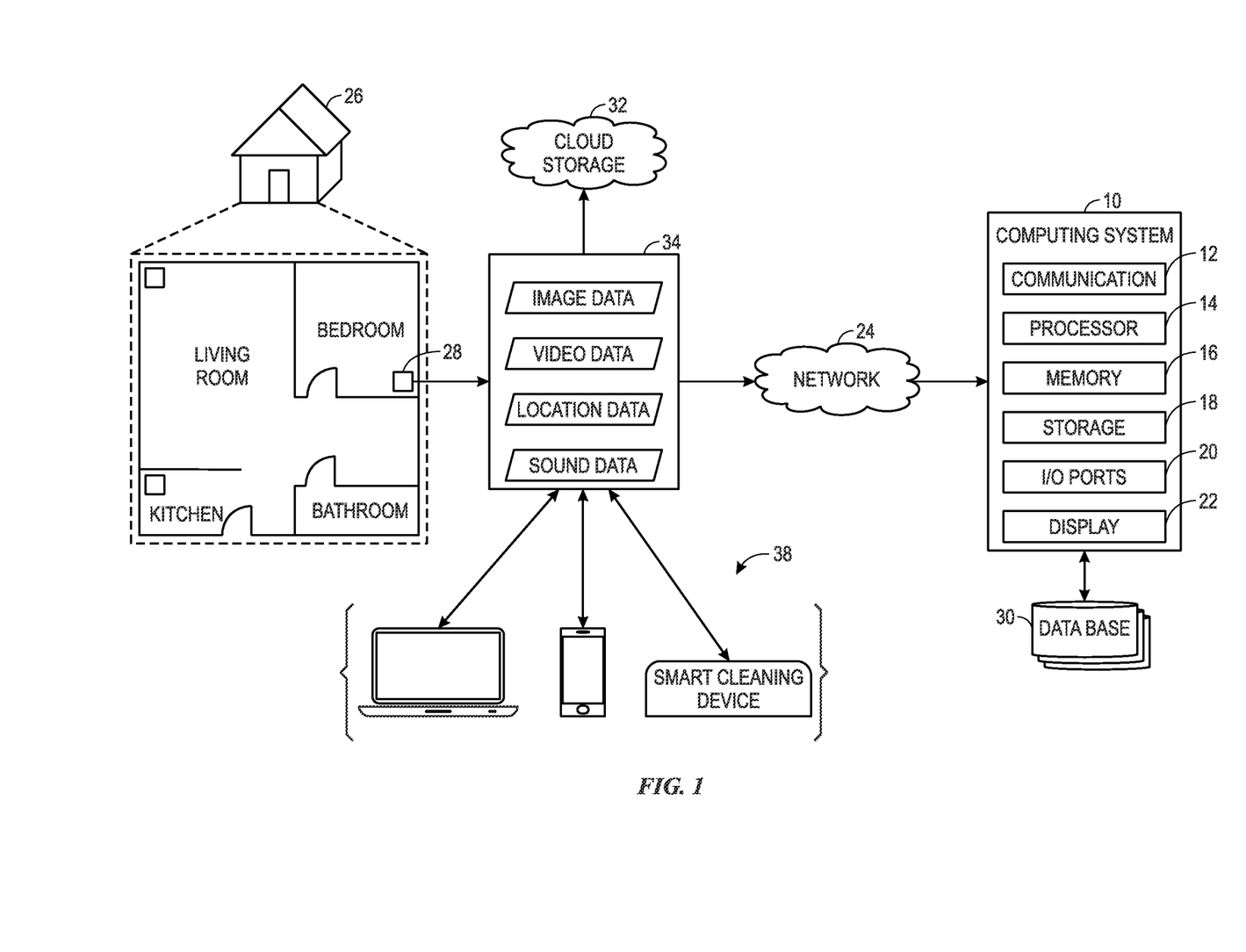
FIG. 1 illustrates a block diagram of a system communicatively coupled to a number of data sources, in accordance with embodiments described herein.

By way of introduction, FIG. 1 is a block diagram of a system communicatively coupled to a number of data sources. The system may include a computing system 10 communicatively coupled to a variety of data sources that may assist the computing system 10 in determining a property insurance policy for a user (e.g., an insurance customer). Data from the variety of data sources may include insurance data (e.g., existing insurance coverage and premium) related to the user, physical data related to the physical features of the property (e.g., temperature, humidity, air quality, noise), visual and image data acquired by smart devices or appliances (e.g., videos, images, security footage) related to possessions within the property (e.g., furniture), behavior data of the user, and the like. Specifically, sensor data 34 may include image data regarding the property represented in the user's image data stored in the databases 30, the cloud storage 32, or any suitable storage component. In some embodiments, sensor data 34 may be gathered from a variety of data sources such as smart devices (e.g., smart plugs, smart thermostat, smart lights, smart cleaners), security appliances (e.g., smart doorbells, cameras, smart locks), mobile devices 38 (e.g., smart phones, laptops, video game consoles), image sensors, and the like.

The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display and the like.

The communication component 12 may be a wireless or wired communication component that may facilitate communication between the computing system 10 and various other computing systems and devices via a network, the Internet, or the like. For example, the communication component 12 may allow the computing system 10 to obtain the data from the variety of data sources, such as databases 30 (e.g., insurance database, sensor data database), cloud storages 32, mobile devices 38 (e.g., smart phones, laptops, security devices), or any suitable storage component. The communication component 12 may receive and send notifications to the smart devices and the mobile devices 38. The communication component 12 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 14 may process instructions for execution within the computing system 10. The processor 14 may include single-threaded processor(s), multi-threaded processor(s), or both. The processor 14 may process instructions stored in the memory 16. The processor 14 may also include hardware-based processor(s) each including one or more cores. The processor 14 may include general purpose processor(s), special purpose processor(s), or both. The processor 14 may be communicatively coupled to other internal components (such as the communication component 12, the storage 18, the I/O ports 20, and the display 22).

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples. Indeed, the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For example, the network 24 may be communicatively coupled to sensors 28 in a property 26. In some embodiments, the sensors 28 may correspond to one or more respective smart devices located within the property 26. In some embodiments, the network 24 may also be communicatively coupled to one or more databases 30, which may store data regarding the property, such as physical characteristics, possessions, location, age, risk profile of the applicant (e.g., claim history, credit score, rental history), sensor data, and other information that may be relevant for determining a property insurance policy. In other embodiments, the network 24 may further be communicatively coupled to one or more cloud storages 32, which may store additional information regarding the property, such as physical characteristics, possessions, location, age, risk profile of the applicant (e.g., claim history, credit score, rental history), sensor data, and other information that may be relevant for determining a property insurance policy.

In certain embodiments, the computing system 10 may receive data from the user and a plurality of sensors 28. The user may be a customer of an insurance provider and may submit data (e.g., list of possessions, insurance premium) regarding the property 26. In some embodiments, the user may use an application (e.g., insurance application from the insurance provider) operating on mobile devices 38 (e.g., desktop computers, laptops, smart phones, tablets) to create data (e.g., list of possessions, age and location of property) regarding the property 26. As an example, a user may be given an application by the insurance provider with questions regarding the property 26 and the type of coverage the user desires. The computing system 10 may store the user's completed application in the databases 30, the cloud storage 32, or any suitable storage component. In some embodiments, the user may also generate data via their mobile devices 38 or via smart devices that may operate on the property 26. The user may provide an indication to the computing system 10 that the sensor data 34 has been uploaded and prepared for analysis. In some embodiments, the computing system 10 may automatically detect the sensor data 34 by monitoring data acquired by or generated by the sensors 28 and/or the mobile devices 38. The computing system 10 may extract information from the sensors 28 regarding the data collected, such as time, location, smart device associated, MAC address, or the like. For example, a first portion of the MAC address may indicate that a particular vendor (e.g., manufacturer) is associated with the smart device, and a second portion of the MAC address may indicate that the smart device belongs to a particular type (e.g., lightbulb). As such, the MAC address may indicate to the computing system 10 that the particular smart device is located within the property 26.

Referring back to the sensors 28, in certain embodiments, the sensors 28 may monitor visual and physical characteristics of the property 26. By way of example, the sensors 28 may correspond with devices (e.g., pet camera, security camera, smart doorbell, smart lock) which may be disposed of inside or outside of the property 26 and may capture sensor data 34 corresponding with the property 26. In another example, the sensors 28 may correspond with one or more devices (e.g., smart plugs, smart lights) which monitor certain qualities about the property 26, such as electricity usage, air quality, living habits, and the like. In some embodiments, the sensors 28 may be communicatively coupled to other computing devices such as mobile devices 38 (e.g., mobile phones, tablet devices), which may allow the user to monitor and control operations of the sensors 28. The computing system 10 may use the communication component 12 to receive sensor data 34 generated by the sensors 28 and may store the sensor data 34 in the database 30 or the cloud storage 32. The sensor data 34 acquired by the sensors 28 may be used to determine visual and physical characteristics of the property 26, possessions within the property 26, new features related to the property 26, and the like.

Although the sensors 28 are described as being communicatively coupled to the computing system 10 via the network 24, it should also be noted that, in other embodiments, the sensors 28 may be communicatively coupled directly to the computing system 10. As such, the sensors 28 may provide data to the computing system 10 in real time or near-real time to enable the computing system 10 to efficiently perform the operations described herein.

In certain embodiments, the computing system 10 may be communicatively coupled to mobile devices 38 of the user. For example, the mobile devices 38 may include a smart phone that enables the user to generate sensor data 34 (e.g., videos and images) of the property 26. Additionally or alternatively, the user may use other mobile devices 38 (e.g., desktop computers, laptops, tablets, video game consoles) to generate the sensor data 34 for model creation, as will described below. The mobile devices 34 may automatically store the sensor data 34 in the cloud storages 32 or the databases 30 for future analysis. In some embodiments the user may prompt the mobile devices 38 to upload the sensor data 34 to the databases 30, the cloud storage 32, or any suitable storage component for the computing system 10 to analyze in model creation. For example, the user may use their mobile device 38 (e.g., smart phone) to generate the sensor data 34 (e.g., photos) while documenting an event taking place on the property 26, such as a birthday party, a holiday, or the like. The user may take photos or videos of their friends or family on the property 26 that include a certain view of the property 26. In another example, the user may use a mobile device 38 to generate the sensor data 34 while texting friends or family members, such as showing newly acquired possessions or updating friends and family on home improvement projects. The user may employ the mobile device 38 to upload the sensor data 34 to the databases 30, the cloud storage 32, or any suitable storage component after the event or conversation. Still, in other embodiments, the mobile devices 38 may automatically upload the new sensor data 34 to the databases 30, the cloud storage 32, or any suitable storage component.

In some embodiments, based on the collected sensor data 34, the computing system 10 may generate a model representative of various objects present in the property 26, conditions of structures in the property 26, and the like. After the model is generated, the computing system may wait a threshold amount of time and collect updated sensor data 34 stored in the databases 30, the cloud storage 32, or any suitable storage component to determine changes in the property, such as the presence of new possessions, remodeling, or the like. For instance, in some embodiments, the computing system 10 may receive the sensor data 34, such as images, stored in the databases 30, the cloud storage 32, or any suitable storage component and digitally stitch the recently acquired images together to create a single image that represents a view in the property 26. That is, the computing system 10 may receive recently acquired images from an event taking place in a living room and digitally stitch them together to create a single image that represents the living room of the property 26. The computing system 10 may compare the digitally stitched image with a certain view (e.g., reference view) of the property 26 and may determine if there are new features present in the property 26. In some embodiments, the comparison may identify new features and the computing system 10 may isolate the new features, send the new features to the mobile device 38 for display, and prompt the user to select a subset of the new features to include in an updated view of the reference view of the property 26. For example, the user may have acquired a new television in the living room. Based on a number of images acquired via the sensor data 34, the computing system 10 may digitally stitch together an updated image that corresponds to the reference image. Using the digitally stitched image, the computing system 10 may identify the television as a new feature by comparing the digitally stitched image to the reference view of the property 26. The computing system 10 may then isolate the television from the digitally stitched image of the living room and present the image of the television to the mobile device 38 of the user for verification. In response to receiving an user selection confirming that the television is a new feature, the computing system 10 may update the model representative of the property 26 to include the television. The computing system 10 may also update a list of possessions in the living room to include the television.

In some embodiments, the computing system 10 may update the model without prompting the user to obtain sensor data 34, rather the computing system 10 may discreetly monitor the property 26 using machine learning to analyze the sensor data 34 stored in the databases 30, the cloud storage 32, or any suitable storage component. That is, the computing system 10 may use machine learning to analyze the sensor data 34 stored in the databases 30, the cloud storage 32, or any suitable storage component and may determine that a manner in which to digitally stitch images together based on the updated sensor data 34. For example, the computing system 10 may detect features that have been added to the property 26 using a machine learning circuitry communicatively coupled to the computing system 10, a machine learning algorithm implemented by the computing system 10, or the like. The machine learning algorithm may access saved models, reference images, and the like and compare newly acquired sensor data 34 to identify new features present in the property 26. After detecting a possible new feature, the machine learning algorithm may retrieve related images (e.g., images of same view at different angles), request updated views from image sensor devices present at the property 36, and the like. Using the additionally received data, the computing device 10 may employ the machine learning algorithm to digitally stitch the updated image of the property 26 that corresponds to the reference view.

As used herein, machine learning may refer to algorithms and statistical models that computer systems use to perform a specific task with or without using explicit instructions. For example, a machine learning process may generate a mathematical model based on a sample of clean data, known as "training data," in order to make predictions or decisions without being explicitly programmed to perform the task. As such, the computing system 10 may passively update the model and send a visualization of the model to the mobile devices 38 of the user for user verification.

With the foregoing in mind, the computing system 10 may recognize that the sensor data 34 contains one or more different angles missing from a certain view in the model (e.g., reference view). The computing system 10 may then digitally stitch the images acquired from the different angles to create an updated image that corresponds to the reference view in order to create a more accurate representation of the property 26. After digitally stitching the images together, the computing system 10 may determine that the updated image of the property 26 may contain a number of objects (e.g., decorations, guests) that obscure the view of certain parts of the property 26. As such, the image (e.g., updated image, reference image) of the property 26 may have a number of gaps in the view. As such, the computing system 10 may digitally stitch the images acquired at the different angles together and update the model to ensure that the updated view accurately represents a current state (e.g., current objects, conditions) of the property 26. As a result, the model of the property 26 may be continuously updated without requesting that the user provide a specific image (e.g., at certain angle, with obstruction removed), thereby allowing the user to passively (e.g., without active updates) maintain an updated account of the state of the property 26 and an updated policy covering the property 26. In some embodiments, the computing system 10 may recognize that the sensor data 34 does not contain any new information to add to the model. As such, the computing system 10 may delete all of the sensor data 34 from the databases 30, the cloud storage 32, or any suitable storage component to make space for latter acquired sensor data 34.

For privacy purposes, the computing system 10 may prompt the user via the mobile devices 38 to select images, portions of images, objects within images, and other types of features present in images that are part of the sensor data 34 to remove from the acquired images from the databases 30, the cloud storage 32, or any suitable storage component. Based on the user's selection, the computing system 10 may delete or remove the selected objects from the digitally stitched images, thereby preventing the selections from being used in updating the model, saved in the databases 30, the cloud storages 32, or the like.

After receiving the filtered digitally stitched image that excludes any user selected objects, the computing system 10 may generate an updated model of the property 26 and generate or update a property insurance policy by analyzing the updated model and the corresponding list of possessions. In some embodiments, the computing system 10 may analyze the updated model, list of possessions, physical characteristics, location, age, risk profile (e.g., claim history, credit score, rental history) of the applicant, or a combination thereof to generate an updated property insurance policy to cover any updated conditions or objects that are present at the property 26. The computing system 10 may send the user a notification via the mobile devices 38 regarding the updated list of possessions, model, and property insurance policy.

Figure 2:
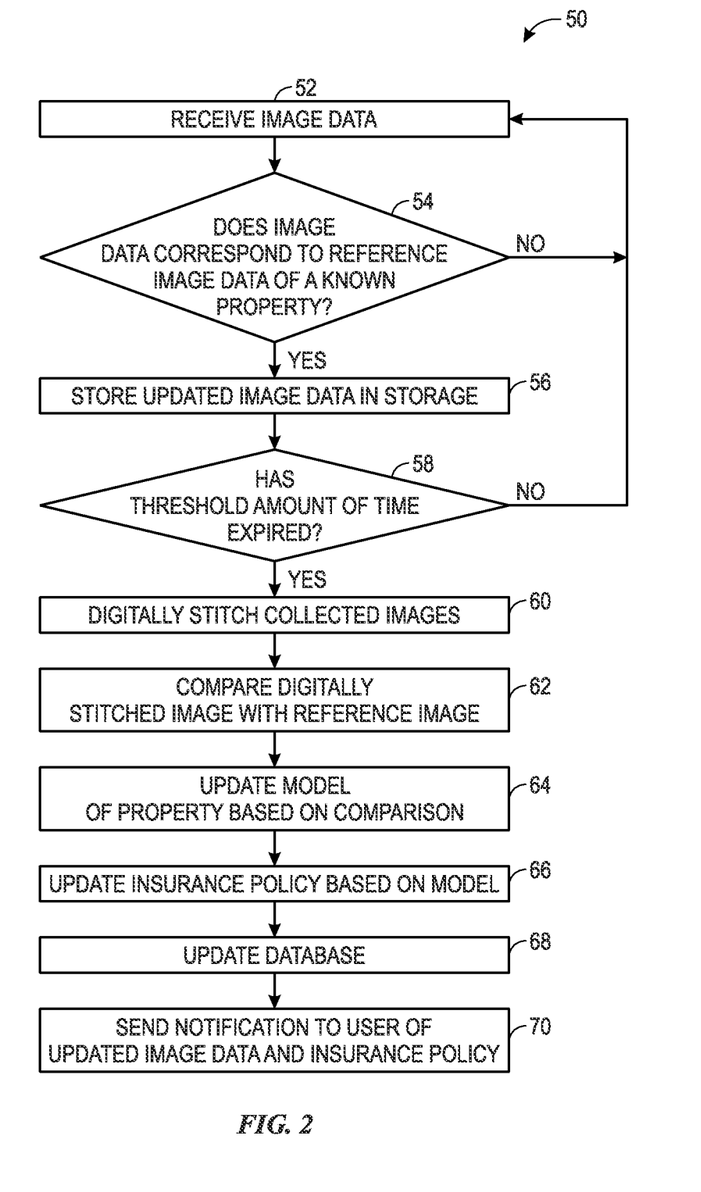
FIG. 2 illustrates a flow chart of an example method for digitally stitching image data associated with a property to generate a model of a property based on the data acquired from the data sources of FIG. 1, in accordance with embodiments described herein.

With the foregoing in mind, FIG. 2 illustrates an example method 50 for digitally stitching image data associated with the property 26 to collected updated data related to the property 26 and used to generate a model. The computing system 10 may perform operations described below via the processor 14 based on processor-executable code stored in the memory 16 and the storage 18. The processor 14 may execute the processor-executable code to perform sensor data analysis and model creation. Based on the monitoring and analysis, the processor 14 may communicate with the computing system 10 to generate or update the property insurance policy for the property 26.

Although the example method described in FIG. 2 is described in a particular order, it should be noted that the example method 50 may be performed in any suitable order and is not limited to the order presented herein. It should also be noted that although each processing block is described below is the example method 50 as being performed by the computing system 10, other suitable computing systems may perform the methods described herein.

By way of operation, the computing system 10 may receive image data that may represent portions of the property 26. The images may be acquired over a period of time during certain events (e.g., birthdays, first day of school). Although the intent of the captured image is unrelated to tracking the objects present in the property or the conditions of the property, the images may be used to identify whether the property 26 should be covered with an updated insurance policy based on the update data available in the recently acquired images.

With this in mind and referring to FIG. 2, at block 52, the computing system 10 may receive image data that may represent or correspond to a portion of the property 26 or the like. As mentioned above, the image data may be acquired via an image sensor or other sensor 28.

In response to receiving the image data, the computing system 10 may, at block 54, determine whether the image data corresponds to reference image data related to the property 26. That is, a user of the device that acquired the image data may be related to one or more properties. As such, after receiving the image data, the computing system 10 may analyze the image data to determine whether the image data corresponds to the property or reference image data related to the property. In one embodiment, the computing system 10 may query metadata associated with the acquired image data to determine a location that corresponds to where the image data was acquired. If the location indicated in the metadata corresponds to the location of the property, the computing system 10 may determine that the image data corresponds to the property 26.

In addition, the computing system 10 may determine whether the image data received at block 52 corresponds to reference image data of the property. The reference image data may include information regarding a reference view of the property 26. The reference image data may be stored in the databases 30, the cloud storage 32, or any suitable storage component. In some embodiments, the reference view may be a certain view (e.g., angle, position) relative to a portion (e.g., room) of the property 26. For example, the reference view of the property 26 may correspond to a kitchen, a living room, a bedroom, or the like. In some embodiments, the reference view may include multiple images that correspond to a complete model of the property 26.

In some embodiments, the reference view may be created with two or more images acquired from different time periods. That is, the computing system 10 or other suitable computing device may receive multiple images of the property during a process in which the reference view(s) are being created. As multiple images are designated as part of a reference view of a particular portion of the property 26, the computing system 10 may identify matching features in two or more of the images and generate updated image data that combines each of the images that have matching features. That is, the computing device 10 may digitally stitch the images together to create a larger scope of a reference view. In some embodiments, after the computing system 10 generates the reference view, the computing system 10 may prompt the user to verify that the reference view accurately represents a current state (e.g., objects, condition) of the property 26.

As used herein, digitally stitching images together may involve analyzing two or more images, videos, or other types of image data media to identify common features. The common features may be identified based on the location associated with the image data, the user associated with the storage in which the image data is stored, and the like. The common features may also be identified by comparing images to each other and identifying common objects, structure, colors, fixtures, and the like. In some embodiments, to digitally stitch images together, the computing system 10 may model or predict a shape or form of an unviewable part of an object depicted in a first image based the shape or form of the same object that is visible in a second image. As such, the computing system 10 may angle, stretch, model, fit, flatten, and perform other suitable types of image data processing techniques to connect images together to form a single view of the property 26 (e.g., to match a reference view). To determine that the received image data corresponds to some reference image data, the computing system 10 may compare the location data present in the metadata of the image data and the reference image data stored in a storage component, perform image recognition analysis to determine that the two sets of image data include similar properties (e.g., objects depicted in the image), or the like. By way of example, the computing system 10 may analyze the image data to determine if the image data is related to the reference image received at block 52. In some embodiments, the computing system 10 may use machine learning to determine where the user took the image data and whether it may be related to the reference view of the property 26. In some embodiments, the computing system 10 may look at the extracted information within the image data (e.g., location, time, smart device, MAC address) and compare it to characteristics of the reference view of property 26 (e.g., location, time, smart devices) to determine if the image data is related to respective reference view.

In some embodiments, the computing system 10 may prompt the user to indicate whether the image data is related to the reference view of the property 26 via the display on the mobile devices 38. Still in other embodiments, the computing system 10 may determine whether a known smart device (e.g., smart lights) is present in the image data based on the location of the corresponding smart device. The cross-referenced locations of the smart devices and the location of the image data may provide insight into the position of the image data within the property 26.

If the computing system 10 determines that the image data is related to reference view of the property 26, the computing system 10 may proceed to block 56 and store the image data in storage (e.g., databases 30, the cloud storage 32) for future analysis. As such, the computing system 10 may continuously store additional image data in the in the databases 30, the cloud storages 32, or any suitable storage component to maintain updated image data related to the reference image data.

If, at block 54, the computing system 10 determines that the image data 34 is not related to reference view of the property 26, the computing device 10 may return to block 52 and receive additional image data. In this way, the storage component may be limited for use to include updated image data that corresponds to the reference image data.

At block 58, the computing system 10 may determine whether a threshold amount of time has expired since the time when an existing model of the property 26 was generated. As mentioned above, the reference image data may be used to generate a model (e.g., two-dimensional, three-dimensional) that represents various conditions (e.g., cracks in wall, age of appliances) and objects (e.g., pieces of equipment, artwork, electronics) that may be present at the property 26. In some embodiments, the computing system 10 may prompt the user to set the threshold amount of time. For example, an insurance provider may want updates of the property every six months to receive notification of any changes in order to provide an adequate property insurance policy for the property 26. As such, the insurance provider may set a six month threshold time period for the computing system 10 to analyze the stored image data, update the model, and generate an adjusted property insurance policy to cover any new features in the property 26. In some embodiments, the computing system 10 may determine that the threshold amount of time since the time when the existing model was generated has expired due to one or more special circumstances (e.g., selection by user, no storage space, significant property changes) and may send a notification to the user regarding analysis of the image data. For example, the computing system 10 may analyze sensor data 34 and may find significant changes (e.g., changes that increase value of policy more than threshold amount) to the property 26 requiring a modification to the property insurance policy. However, if the threshold amount of time since the model was generated has not expired, the computing system 10 may return to block 52 and continue to receive the image data.

After the threshold amount of time expires, the computing system 10 may use the recently acquired image data to determine if new features are present in the property 26. At block 60, the computing system 10 may retrieve the stored image data from storage (e.g., database, cloud storage), organize it according to a particular attribute (e.g., date, location), and digitally stitch together multiple images into a single image that represents a view in the property 26. The digitally stitched image may then be used for comparison to the model (e.g., reference view) to identify updated objects, equipment (e.g., electronics, jewelry, furniture), conditions, and the like within the property 26. For example, the computing system 10 may organize image data according to date of capture to identify changes in the property 26 over time. For example, the user may capture multiple images or videos on a certain date when documenting a special occasion. As such, the computing system 10 may retrieve the corresponding image data and may digitally stitch together an image containing the certain view of the property 26 that corresponds to the reference view. That is, each individual image may not provide a representative view of the reference image. However, by combining the images received by the computing system 10, the computing system 10 may generate a single image that mirrors the reference image for image analysis. For example, the computing system 10 may initially have image data showing only half of the bedroom. The computing system 10 may continue to analyze the stored image data and may later receive image data showing the other half of the bedroom. As such, the computing system 10 may stitch together the image data to generate a complete image representative of the bedroom.

At block 62, the computing system 10 may compare the digitally stitched image with the current model (e.g., reference view) of the property 26 to determine if there are new features present in the property 26. In some embodiments, the computing system 10 may use machine learning to identify new features within the property, prompt the user to select a subset of new features to include in the model, and update the model accordingly. For example, the computing system 10 may find that the user recently changed the floors of the property 26 by identifying that the floors in the digitally stitched image are different from the floors in the reference view. As such, the computing system 10 may present a visualization to allow the user to verify that the change in floors occurred. In some embodiments, the computing system 10 may prompt the user to answer some questions regarding the detected change (e.g., floors), such as look, quality, and quantity and include these physical properties with the updated model. That is, the computing system 10 may send the new features to the mobile device 38 to allow the user to verify the addition of new features detected in the image data based on the comparison to the reference image data before updating the model to ensure an accurate representation of the property 26.

The computing system 10 may update the model with the subset of new features selected by the user. In some embodiments, updating the model may include digitally stitching or replacing the reference view with an image having the same perspective as the reference view and including the subset of new features selected by the user or any features identified based on the comparison with the reference image. In some embodiments, the computing system 10 may use machine learning to identify portions of missing parts of the property 26 in the current model and supplement or add to the missing parts with the digitally stitched image created based on recently acquired image data. For example, the computing system 10 may find that the model is missing a door in the living room due to the reference image having the door left open. The computing system 10 may subsequently identify the missing door in the digitally stitched image generated based on the recently acquired images. As such, the computing system 10 may update the model with the missing door and send the updated model to the user via the mobile devices 38 for verification. As such, the computing system 10 may prompt the user to provide inputs to verify the subset of new features or include some additional information to fill in the missing parts of the current model after the model has been updated. In some embodiments, the computing system 10 may send a prompt the mobile devices 38 asking the user to provide additional data regarding the property, such as images, list of possessions, or the like. The computing system 10 may update the model with the new features or additional data by digitally stitching them to the reference view, which may be used to update the current model.

At block 66, the computing system 10 may analyze the updated model representative of the property 26 to update the property insurance property. In some embodiments, the computing system 10 may analyze the subset of new features added to the model to determine a new property insurance policy that covers any additional objects or updates detected within the property 26. For example, the customer may acquire a new television, video game console, and a new dining table that the customer may want insured by the property insurance policy. As such, the computing system 10 may update the model to include these new features and analyze the updated model to adjust the property insurance policy to include the new features. In another example, the customer may remove a television from the property and the digitally stitched image may indicate that the television is no longer present. The property insurance policy may then be adjusted to reflect the changes. In some embodiments, the computing system 10 may present multiple new policies for the user to select based on different factors (e.g., levels of insurance premiums, user preferences, updates detected). The computing system 10 may allow the user to select different factors for property insurance policy determination and the computing system 10 may take these factors into account when generating a new property insurance policy.

At block 68, the computing system 10 may update the storage (e.g., databases 30, cloud storages 32) with the new model of the property 26 and the updated property insurance policy. In some embodiments, the computing system 10 may replace the current model with the new model including the subset of new features. To protect the privacy of the user, the computing system 10 may delete the digitally stitched images that were generated in the process of updating the model. Additionally or alternatively, the computing system 10 may automatically erase the sensor data 34 used in creating the model from the databases 30, the cloud storage 32, or any suitable storage component to make space in the databases 30. In some embodiments, the computing system 10 may send a prompt to the mobile device 38 confirming that the user wishes for the image data stored in the databases 30, the cloud storage 32, or any suitable storage component to be erased. For example, the user may want to delete all image data used in the model creation for privacy reasons or in order to increase storage space in the databases 30, the cloud storage 32, or any suitable storage component.

At block 70, the computing system 10 may send a notification to a computing device associated with the user. The notification may include information regarding the updated model of the property 26 and the updated property insurance policy. For example, the computing system 10 may present a visualization of the updated model on the display of the mobile devices 38 to the user and may prompt the user to verify the accuracy of the model before updating it in the databases 30, the cloud storage 32, or any suitable storage component. The computing system 10 may display the new property insurance policy on the mobile device 38 for the user to verify before storing the updated property insurance policy in the databases 30, the cloud storage 32, or any suitable storage component. Such automatic notification may be beneficial for the user because it allows the user to maintain an accurate and complete property insurance policy.

In some embodiments, the notification may be sent to the user's computing device (e.g., mobile device 38) and the computing device may automatically open or execute an application to visually present the notification. The notification may be accompanied by an alert, such as an audible, visual, or haptic alert to enable the user to become aware of the update. The notification may cause the computing device to perform operations (e.g., execute, present visualization) even while the computing device is in a low power or sleep mode. Indeed, the notification may cause the computing device to open an application that is currently inactive to enable the computing device to present the notification.

By performing the method 50, the user may dynamically update an insurance policy for the property 26 without actively providing information to an insurance policy provider. That is, individuals often do not realize that policies should be updated to include renovations, damage, new equipment, loss of equipment, and the like. By passively monitoring the image data associated with the property and digitally stitching the images together, the computing system 10 described herein may continuously update a model representing the property 26. Indeed, the digitally stitched image may be generated to match the reference image, such that comparisons between the two images may yield accurate results with regard to the changes or updates within the property 26. Moreover, by comparing the same image view, the computing system 10 may yield more accurate results while using less processing power given that the comparisons are performed using like images. As a result, the updates or changes are detected more efficiently (e.g., processing power, time) and the insurance policy is updated dynamically while limiting user input.

Figure 3:
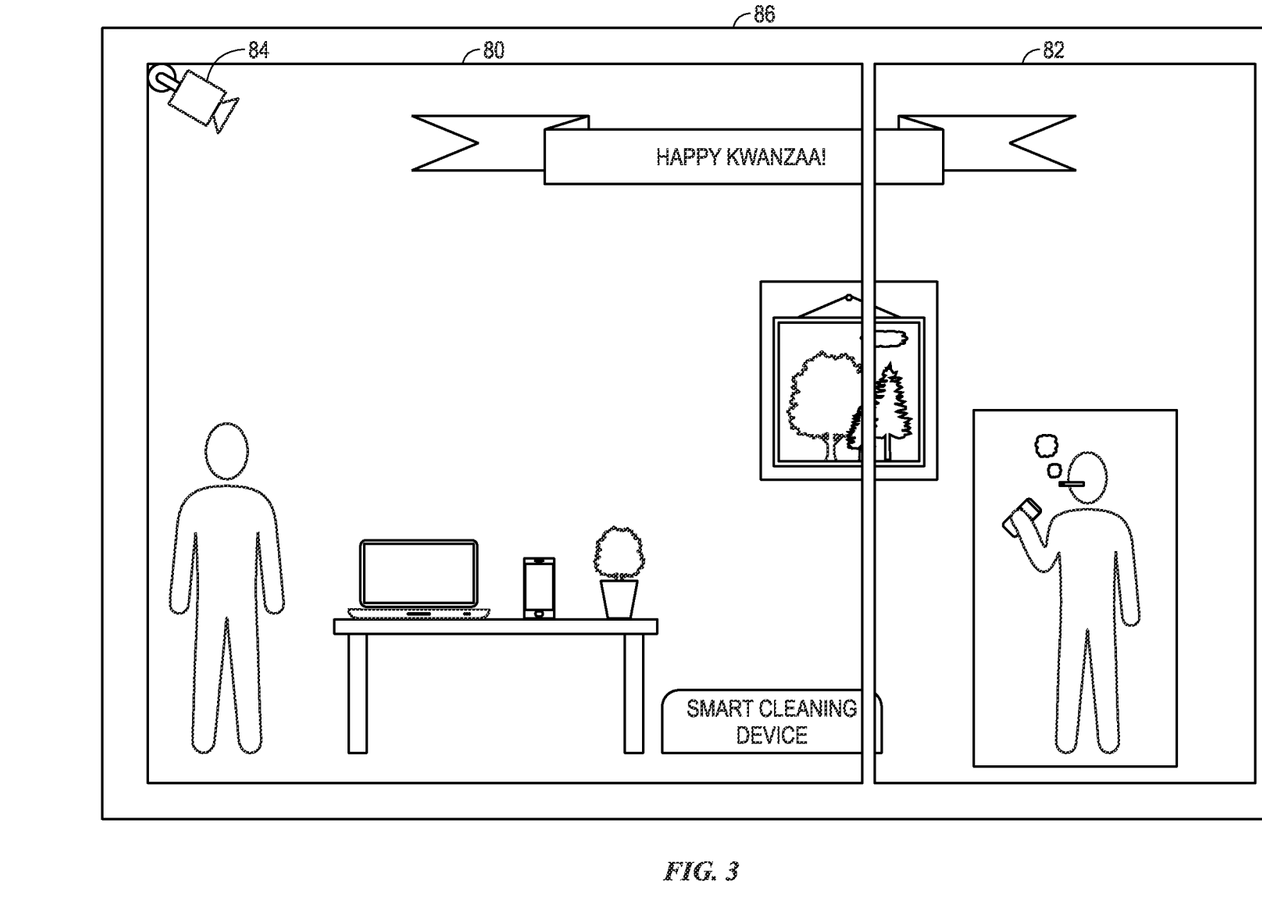
FIG. 3 illustrates two example images acquired by the data sources of FIG. 1 before the images are digital stitched together, in accordance with aspects of the present disclosure.

With the preceding in mind, FIG. 3 is an embodiment of a display on the mobile devices 38 that illustrates two example images acquired by sensors 28 or mobile devices 38 before the computing system 10 digitally stitches them together. In other words, FIG. 3 shows two pre-stitched images 80 and 82 that may represent different portions or views of the property 26. In some embodiments, the computing system 10 may receive sensor data 34 (e.g., image data) from the mobile devices 38 of the user automatically uploading image data to the databases 30, the cloud storage 32, or any suitable storage component. For example, the user may acquire image data (e.g., photos or videos) during a birthday party and save the photos to their mobile device 38. The image data may provide different angles of a certain view of the property 26 for personal purposes rather than for property insurance policy determination. The mobile devices 38 may upload the image data to the databases 30, the cloud storage 32, or any suitable storage component for future analysis.

In some embodiments, the computing system 10 may also receive sensor data 34 (e.g., image data) from sensors 28 that correspond to smart devices within the property 26. For example, the property 26 may contain cameras (e.g., pet cameras, security cameras, smart doorbells) that are disposed of outside and inside of the property 26. The cameras 84 may continuously generate sensor data 34 (e.g., videos, images, sounds) regarding the property 26. In some embodiments, the camera 84 may be fixed to the property, or kept in one position on the property.

In the example presented in FIG. 3, the camera 84 may capture data corresponding to a certain view of the property, or image 80. However, the computing system 10 may also receive image 82 from additional sensor data 34 acquired with other sensor devices located within the same area of the property 26. Based on the properties (e.g., location, shared objects) of the images 80 and 82, the computing system 10 may connect, overlay, or digitally stitch the images 80 and 82 together to form a complete image 86 to the user to perform comparison operations, update insurance policies, and other tasks described above with reference to FIG. 2. In some embodiments, the sensor data 34 may not have been created on the same day, rather the computing system 10 may find relevant sensor data 34 acquired at any time after the existing images in the databases 30, the cloud storage 32, or any suitable storage component were acquired to create a model representative of the property 26.

Figure 4:
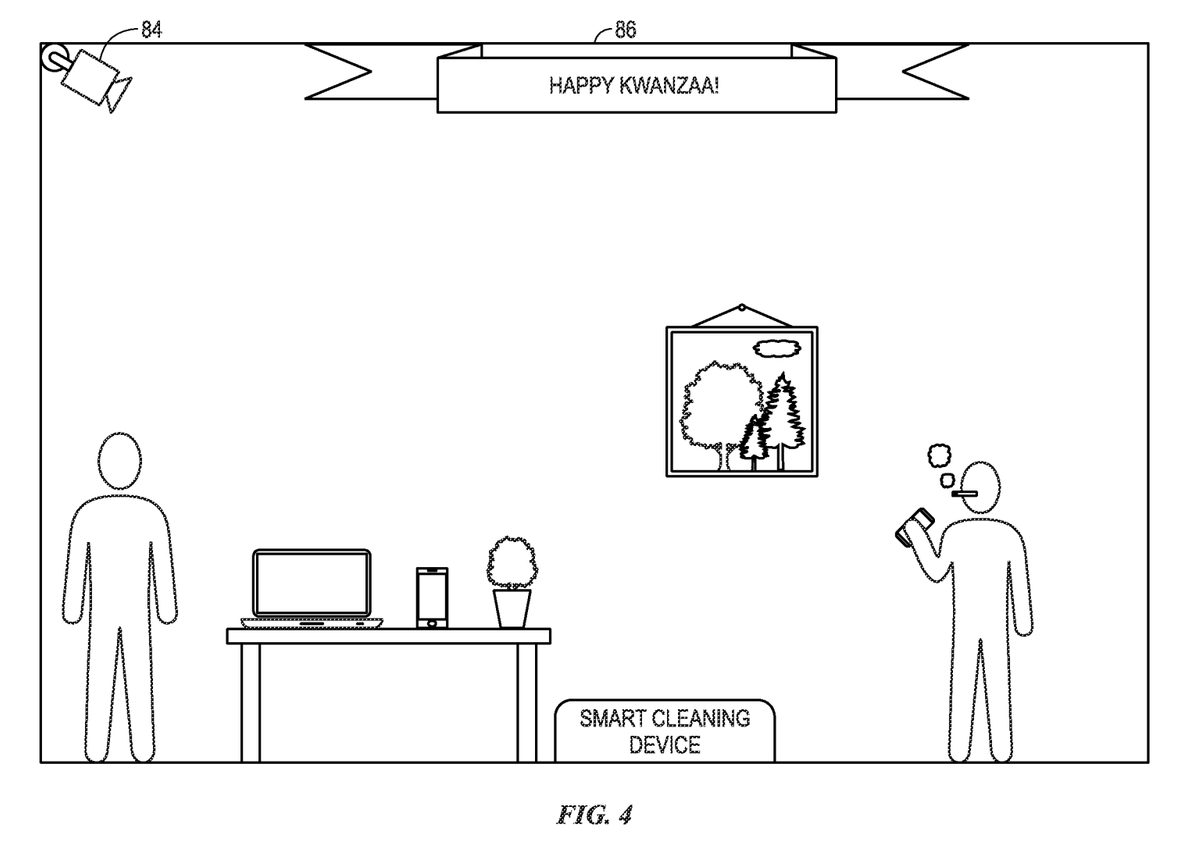
FIG. 4 illustrates a model of the property created from the two images presented in FIG. 3, in accordance with aspects of the present disclosure.

With the foregoing in mind, FIG. 4 illustrates the digitally stitched image 86 that has may be used to update a model representative of the property 26. In other words, FIG. 4 shows a digitally stitched image created by the computing system 10 based on the sensor data 34 (e.g., image data) from sensors 28. In some embodiments, the computing system 10 may take two or more images and digitally stitch them together to create a single image that represents a view in the property 26. The digitally stitched image 86 may provide a view of the property 26 that may enable the computing system 10 to more quickly identify differences or new additions as compared to the current model of the property 26.

Figure 5:
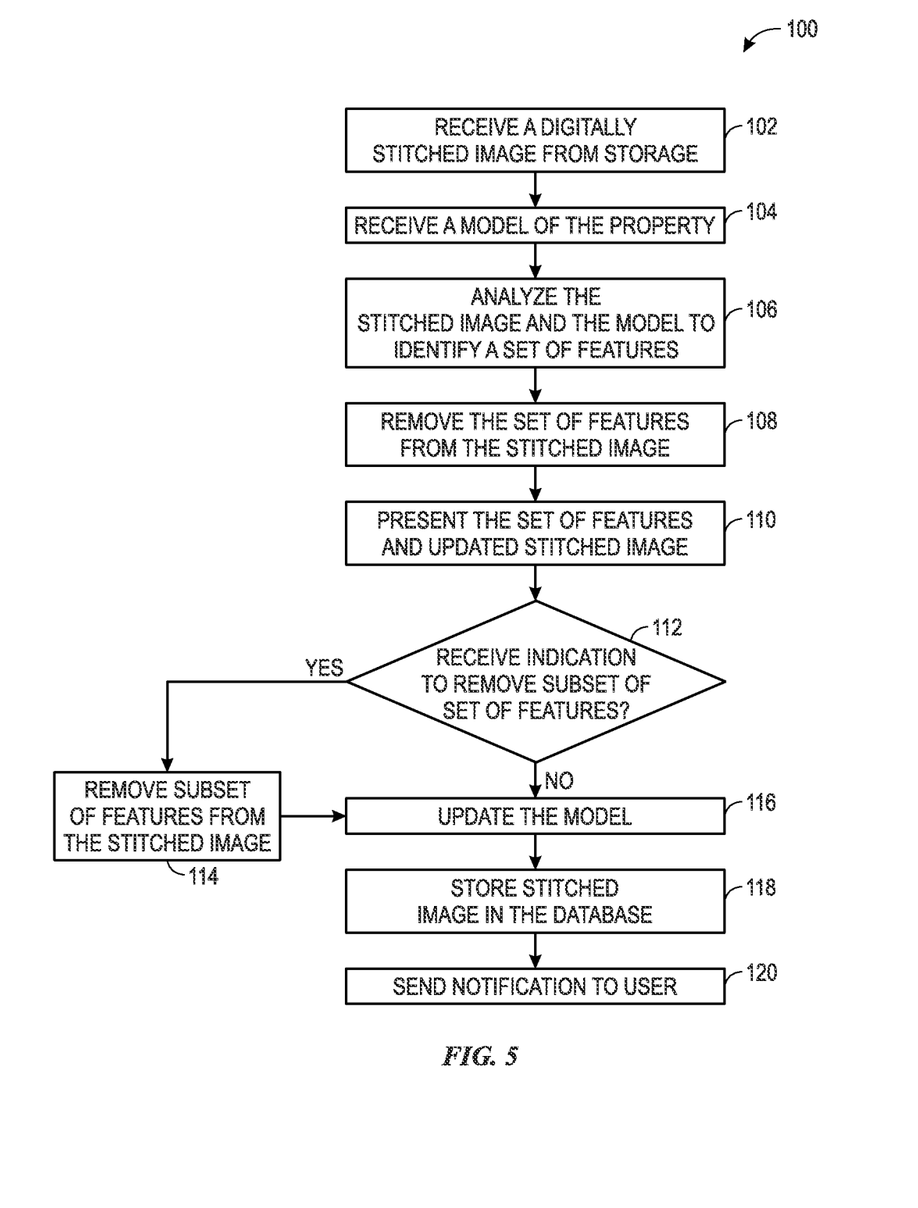
FIG. 5 illustrates a flow diagram of an example method for selecting certain features to filter or remove from image data that may be used to update the model created in FIG. 2, in accordance with embodiments described herein.

After the computing system 10 digitally stitches together an image representative of a view of the property 26, the computing system 10 may update the current model to add new features depicted in the digitally stitched image 86, remove some features no longer present, update conditions of objects in the digitally stitched image 86, and the like for property insurance policy determination. FIG. 5 illustrates a flow chart of an example method 100 for isolating features identified from the digitally stitched image 86 and adding or removing identified features to the current model. Although the example method 100 described in FIG. 5 is described in a particular order, it should be noted that the example method 100 may be performed in any suitable order and is not limited to the order presented herein. It should also be noted that although each processing block is described below in the method 100 as being performed by the computing system 10, other suitable computing systems may perform the methods described herein.

Referring now to FIG. 5, at block 102, the computing system 10 may receive a digitally stitched image associated with the property 26 from storage (e.g., databases 30, cloud storages 32). For example, the computing system 10 may retrieve a digitally stitched image 86 and use it for comparison to the current model in order to identify features or updated features regarding the property 26. In some embodiments, the computing system 10 may send a prompt to the mobile devices 38 of the user requesting that the user identify a digitally stitched image 86 to provide to the computing system 10. For example, the user may have recently remodeled the kitchen and may want to update the model representative of the kitchen. As such, the user may select a digitally stitched image 86 representative of the kitchen to provide to the computing system 10.

Alternatively, the computing system 10 may continuously receive digitally stitched image data in response to the digitally stitched image 86 being created, stored, or the like. As such, the present embodiments may enable the user to protect the privacy or manage the content of the data being provided to the computing system 10.

At block 104, the computing system 10 may retrieve the current model of the property 26 from storage in response to receiving the digitally stitched image. The computing system 10 may retrieve the model by user indication, machine learning, or any other suitable methods. As discussed above, the user may have remodeled the kitchen and want to update the model of the kitchen for property insurance policy purposes. As such, the user may indicate to the computing system 10 through their mobile devices 38 to retrieve the current model of the kitchen.

In other embodiments, the computing device 10 may use machine learning algorithms to analyze the digitally stitched image 86 and identify a reference image or portion of a model of the property 26 that corresponds to the digitally stitched image 86. As mentioned above, since the digitally stitched image 86 may be created according to a format or view that matches a reference image, a portion of the model, or the like. In some embodiments, the digitally stitched image 86 may include metadata that identifies a reference image, a portion of the model, or both that corresponds to the digitally stitched image. The computing system 10 may retrieve the model of the property in response to receiving the digitally stitched image 86 or upon request received from a user via the mobile devices 38.

After retrieving the digitally stitched image 86 and the current model of the property 26, at block 106, the computing system 10 may identify features present in the digitally stitched image 86 that may be identified as being new, missing, updated, or the like, as compared to the current model of the property 26. That is, the computing system 10 may compare the digitally stitched image 86 to the current model to identify the differences between the two. In some embodiments, the computing system 10 may perform the comparison and identify new features present in the digitally stitched image 86, missing features in the digitally stitched image 86, and the like. The computing system 10 may isolate these features from the digitally stitched image 86 and send images of the features to the mobile device 38, such that they may be displayed for the user. The computing system 10 may prompt the user to select a subset of the features to use in updating the current model. For example, the user may acquire new furniture that appears in the digitally stitched image 86. As such, the user may want to update the model with the new furniture to ensure that they has adequate property insurance protection for their possessions. In some embodiments, the computing system 10 may compare the digitally stitched image 86 to the model generated based on the reference image and may not be able to identify any different features in the property 26. That is, the digitally stitched image 86 may not present different features because there may not be any changes made to the property 26 during the threshold hold period of time since the model was last updated. As such, the model in the databases 30 may remain an accurate representation of the property 26. The computing system 10 may send a prompt to the mobile devices 38 asking the user to verify that the current model remains the most accurate representation of the property 26 in case the user wishes to manually add or subtract features covered by an existing policy.

After identifying the features, at block 108, the computing system 10 may isolate or remove the identified features from the digitally stitched image 86 and present them to the user via the mobile device 38 or other suitable computing device for user verification. In some embodiments, the computing system 10 may compare the digitally stitched image 86 to the current model, the reference image, or the like, and identify the features, based on the detected differences. As mentioned above, the image comparison processing may be performed efficiently using limited computing resources by comparing the digitally stitched image or the corresponding model that matches the reference view. In some embodiments, the computing system 10 may overlay the two or more images over each other to quickly ascertain the differences between the images.

After isolating and removing the identified images from the digitally stitched image 86, the computing system 10 may display the isolated features in a window or portion of a display adjacent to the digitally stitched image 86. That is, at block 110, the computing system 10 may display the isolated features on a display with the altered digitally stitched image 86 having the features removed. In some embodiments, the computing system 10 may send data regarding the isolated features to the mobile device 38 or other suitable computing device associated with the user to notify the user that the comparison between the digitally stitched image 90 and the model has been completed and may be ready for user verification. The mobile device 38, in response to receiving the notification, may automatically execute an application or generate a prompt visualization for the user to select any or none of the features of digitally stitched image 86 to include or exclude in the model. That is, the mobile device 38 may present an image of the digitally stitched image 86 with the isolated features separated from the digitally stitched image 86. The mobile device 38 may also display the isolated image with a shading, outline lining, or other visual effect to denote that the features are different from the previous model. For example, the mobile devices 38 may place the isolated new features next to the altered digitally stitched image 86 to allow the user to more quickly view the features that have been isolated by the computing system 10, such that the user may select the features that may be added to the model.

In some embodiments, the digitally stitched image 86 may be presented on top of the current model of the property 26 that may be used as a background. In some embodiments, the background image may be the digitally stitched image 86 with the isolated features lifted from the digitally stitched image 86.

The prompt displayed to the user via the mobile device 38, the computing system 10, or the like, may request that the user select the features to be added, removed, or filtered from the digitally stitched image 86, the collected sensor data 34, or the like. The prompt visualization may include checkbox or other selection visualization tools next to the isolated new features for the user to select the corresponding feature to include in the digitally stitched image 86, the model, or the like. The user may select none, one, or more features to be added or removed from the digitally stitched image 86, which may be updated based on the selection and used to create an updated model representative of the property 26. As such, the user may filter out features that may not be representative of items stored at the property 26 (e.g., equipment from guests) and prevent the computing system 10 from adding unrelated features to the model.

At block 112, the computing system 10 may determine whether any indication to remove or keep features in the digitally stitched image 86 is received. If the indication is received (e.g., after the user provides her selection to the mobile device 38, the computing system 10, or other suitable computing device that received the data related to the isolated features), the computing system 10 may proceed to block 114 and remove or censor the features selected for removal from the digitally stitched image 86. For example, the computing system 10 may identify humans as the features and the user may want to censor or remove the humans from the digitally stitched image 86 rather than include them in the model or the stored image data to protect the privacy of the humans. In another example, the computing system 10 may identify decorations as the features and the user may not want to include the decorations in the model since they may not be permanent fixtures of the property 26.

In some embodiments, the computing system 10 may allow the user to pick certain aspects of the features to include in the model. For example, the computing system 10 may detect a person holding an item (e.g., beer) inside of the property 26 that may be part of a list of items that the user, a machine learning algorithm, or the like may be previously identified as being censored from stored image data. The user may indicate via the check boxes to the computing system 10 to censor remove the item (e.g., beer) from the digitally stitched image 86 and include the person in the digitally stitched image. As such, the final digitally stitched image 86 may include the person but a visualization effect that censors the portion of the image that corresponds to the hand of the person.

In some embodiments, a machine learning algorithm may monitor the selection of features, items, and other portions of image data that is selected to be censored or removed from images. The machine learning algorithm may collect the selection data and the resulting decisions from the user to better understand the likelihood that the user will wish to include the features in the digitally stitched image 86. That is, the computing system 10 may incorporate the machine learning algorithm to track the selection of the user and preemptively select or recommend to the user to remove certain features via the prompt presented to the user. In this case, the user may more quickly identify and remove features from the digitally stitched image 86 to increase the user's ability to use and operate the embodiments described herein.

After removing the selected features from the digitally stitched image 86, at block 116, the computing system 10 may update the model based on the altered digitally stitched image 86. At block 118, the computing system 10 may upload the updated model and the digitally stitched image 86 to the databases 30, the cloud storages 32, or any suitable storage component. In some embodiments, the computing system 10 may permanently delete (e.g., delete and store over corresponding memory with pseudo random data) previously saved versions of the digitally stitched images 86, the sensor data 34 or the image data used to generate the digitally stitched image 86, or the like. In some embodiments, the computing system 10 may send the mobile device 38 or other suitable computing device a prompt that may allow the user to select whether to permanently delete any data (e.g., digitally stitched images 86 or stored sensor data 34) from the databases 30, the cloud storages 32, or any suitable storage component.

In some embodiments, the computing system 10 may analyze the updated model to make a property insurance policy determination as described above with reference to FIG. 2. For example, the computing system 10 may identify new features in the model and generate the property insurance policy to include the new features. In another embodiment, the computing system 10 may send a prompt to the user via the mobile devices 38 asking if the user would like a new property insurance policy.

The computing system 10 may then update the databases 30, cloud storages 32, or the like with the model of the property 26, property insurance policy, and the digitally stitched images 86. In some embodiments, the computing system 10 may replace the current model with the new model representative of the property 26 in the databases 30, cloud storages 32, or any suitable storage component. Additionally or alternatively, the computing system 10 may store the new property insurance policy in the databases 30, the cloud storage 32, or any suitable storage component.

At block 120, the computing system 10 may send a notification to the mobile device 38 or other suitable computing device associated with the user similar to the notification described above with reference to FIG. 2. The computing system 10 may notify the user via the mobile devices 38 that the databases 30 have been updated with a new model, property insurance policy, digitally stitched images, or a combination thereof. The computing system 10 may, in some embodiments, send a notification to the mobile devices 38 that may cause the mobile devices 38 to generate audio alerts, present images, vibrational alerts, or other methods to inform the user that the databases 30 may have been updated even while a corresponding application that presents the prompts and data described herein is a sleep mode, a low power mode, a background mode, inactive (e.g., unexecuted), and the like. Additionally or alternatively, the computing system 10 may use a push notification through the display of the mobile device 38 to tell the user that the property insurance policy has been updated and ready for review.

As discussed above, by employing the embodiments described herein, the computing system 10 may determine a new or updated property insurance policy based on the updated model and notify the user of the changes. For example, the computing system 10 may evaluate the possessions, the current property insurance policy, the updated model, and the like to determine whether an updated property insurance policy will be beneficial to the user. By monitoring new features of the property 26, the computing system 10 may provide real time updates to the user regarding property insurance policy determination. After updating the property insurance policy, the computing system 10 may send one or more property insurance policies to the mobile devices 38 for user review and selection. In some embodiments, the user may select one or more of the policies for an in-depth review and may determine the most suitable policy for the property 26. As such, the user may select their preferred property insurance policy on the display of the mobile devices 38 which may send the indication to the computing system 10. In some embodiments, the user may modify some of the property insurance policy offers by selecting different features. For example, the user may modify the features of the model, the information about the new features, and other relevant variables to change the property insurance policy. In some cases, the user may include additional data points that may have been missed by the computing system 10 which may also change the final property insurance policy determination.

Figure 6:
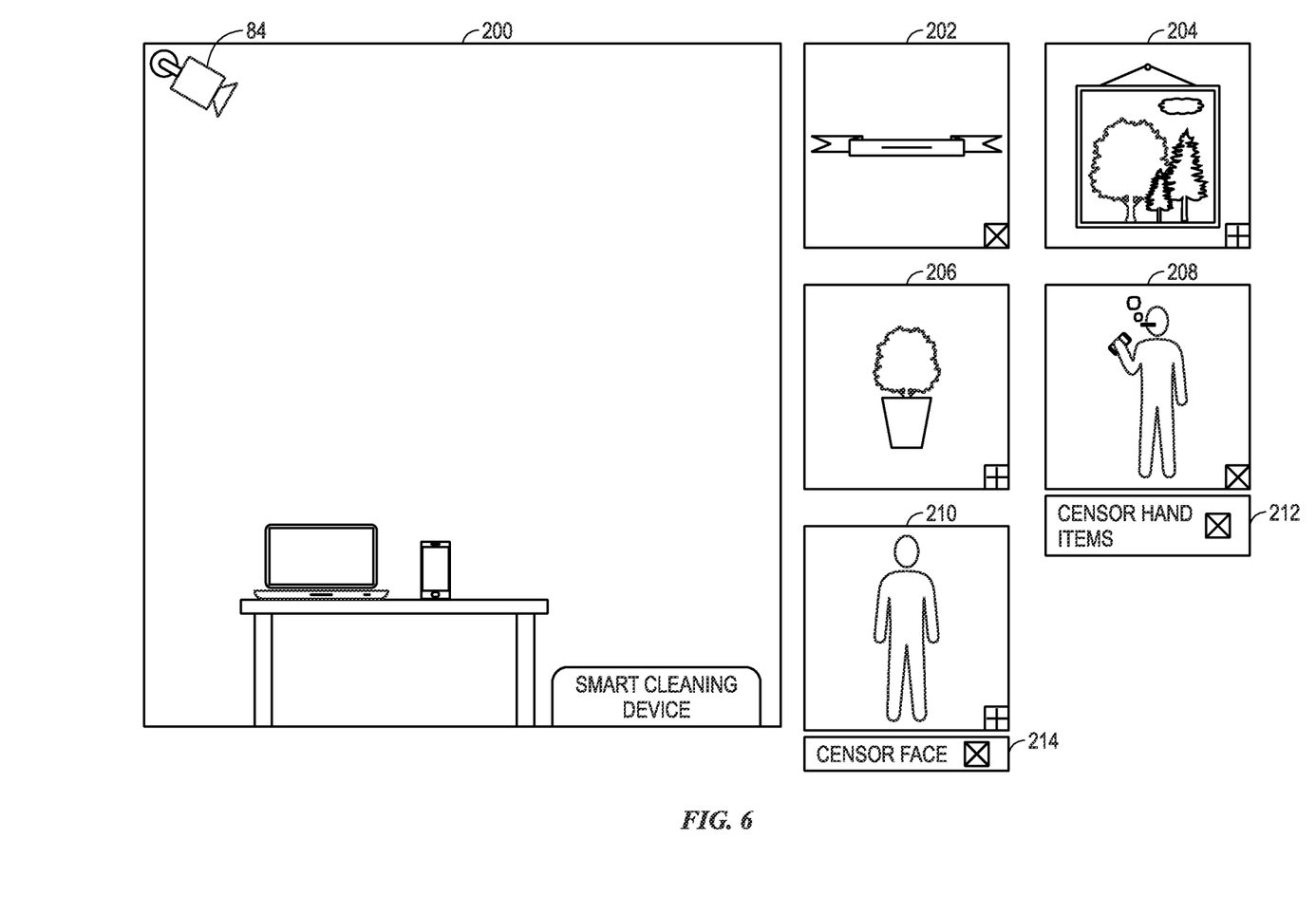
FIG. 6 illustrates a display of a system prompting a user to select certain features acquired from the data sources of FIG. 1 to filter from the acquired image data or add to the model, in accordance with embodiments described herein.

With the preceding in mind, FIG. 6 is an embodiment of a display on a mobile device 38 prompting a user to select features for the computing system 10 to add in updating the current model. The computing system 10 may compare the digitally stitched image 86 representing a view of the property 26 with the current model to identify features in the property 26, isolate the features from the digitally stitched image 86, and display the features for user selection.

By way of example, the mobile device 38 may use the model retrieved from the databases 30 as a first image 200. The mobile device 38 may place the identified features (e.g., 202, 204, 206, 208, and 210) next to the image 200 for the user to view. The mobile device 38 may include checkboxes corresponding to each feature for the user to select whether the feature may be included in updating the model. In some embodiments, the mobile device 38 may identify decorations 202 and the user may not want to include the decorations 202 in the model since they may not be permanent fixtures of the property 26. As such, the user may indicate to the mobile device 38 via the mobile devices 38 that the decorations 202 may not be included in the model by placing an 'X' in the corresponding checkbox.

In some embodiments, the mobile device 38 may allow the user to pick certain aspects of the features to include in updating the current model. For example, the mobile device 38 may detect a person as feature 212 and feature 214 as a feature of the property 26. However, the user may want to censor objects (e.g., beer, cigarette), the face of the person, or the like but still include the person in the updated model. As such, the user may pick the option 'censor object' or 'censor face' and indicate to the mobile device 38 that only certain aspects of the feature 212 or the feature 214 may be included in updated model.

In some embodiments, the mobile device 38 may provide a tool that allows the user to select a portion of the identified feature to exclude or censor. The machine algorithm, over time, may recognize patterns (e.g., more than threshold amount of time, percentage of selections) of the portions of the feature to exclude and may automatically update the prompt presented to the user via the mobile device 38 to preemptively indicate a portion of the digitally stitched image 86 or isolated feature selected for censorship or removal.

Referring to the isolated features (e.g., 202, 204, 206, 208, and 210), the mobile device 38 may allow the user to select the features to be added, removed, or filtered from the updated model. In some embodiments, the mobile device 38 may identify a feature that is representative of a non-permanent fixture 202 to the property 26. For example, the image data may contain humans, pets, objects, and the like, and the mobile device 38 may identify these humans, pets, objects, or the like as a feature. As such, the user may choose to censor part of the feature, censor all the feature, include part of the feature, or include all of the feature. In some embodiments, the mobile device 38 may identify a feature that the user may want to include in the updated model representative of the property 26. For example, the user may buy new furniture 204 for the property 26 and indicate to the mobile device 38 that the new furniture 204 may be used in the model of the property 26. In another example, the user may alter the property 26 by removing furniture or permanent fixtures (e.g., cabinets, floors, countertops) and indicate to the mobile device 38 that the furniture or permanent fixtures should be removed from the model of the property 26.

Although the techniques and methods described herein are described as being performed by various computing devices, it should be noted that any suitable computing device described herein may be used to perform various portions of the methods detailed herein. For example, although FIG. 6 is described as being performed by the mobile device 38, it should be understood that the computing system 10 may perform the tasks described above with reference to FIG. 6 if the user uses and is associated with the computing system 10, such that notifications and other data relevant to the embodiments described herein as accessible to the user.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
 a storage component; and
 a processor configured to:
  receive a digitally stitched image representative of at least a portion of a property from the storage component, wherein the digitally stitched image comprises a single image that is generated by digitally stitching a plurality of images collected over a period of time and stored in a database;
  receive a model representative of the property from the storage component;
  compare the digitally stitched image to the model representative of the property to identify one or more objects present in the at least a portion of the property being held by or disposed on a person represented in the digitally stitched image;

present the one or more objects via an electronic display;

receive one or more inputs indicative removing at least one object of the one or more objects;

generate an altered digitally stitched image based on the digitally stitched image and the one or more objects;

update the model representative of the property based on the altered digitally stitched image; and send a notification indicative of the updated model representative of the property to a computing device.

2. The system of claim 1, wherein the processor is configured to generate the altered digitally stitched image by removing the portion of the one or more objects from the digitally stitched image.

3. The system of claim 1, wherein the digitally stitched image corresponds to a single image representative of a combination of two or more images associated with the at least a portion of the property, and wherein the two or more images are combined together using one or more image processing techniques.

4. The system of claim 3, wherein the one or more image processing techniques comprise an angle operation, a stretch operation, a model operation, a fit operation, a flatten operation, or any combination thereof.

5. The system of claim 1, wherein the one or more objects correspond to one or more new objects, one or more missing objects, one or more updated objects, or any combination thereof.

6. The system of claim 1, wherein the altered digitally stitched image censors the portion of the one or more objects.

7. The system of claim 1, wherein the portion of the one or more objects comprises a face of the person, an object held by the person, or both.

8. A method, comprising:
receiving, via a processor, a digitally stitched image representative of at least a portion of a property from a storage component;

receiving, via the processor, a model representative of the property from the storage component;

comparing, via the processor, the digitally stitched image to the model representative of the property to identify one or more objects present in the at least a portion of the property being held by or disposed on a person represented in the digitally stitched image;

sending, via the processor, data comprising the one or more objects to a computing device for presenting via an electronic display;

receiving, via the processor, additional data indicative of a portion of the one or more objects from the computing device;

generating, via the processor, an altered digitally stitched image based on the digitally stitched image and the portion of the one or more objects;

updating, via the processor, the model representative of the property based on the altered digitally stitched image; and sending, via the processor, a notification indicative of the updated model representative of the property to a computing device.

9. The method of claim 8, wherein the altered digitally stitched image comprises a visual effect applied to the portion of the one or more objects.

10. The method of claim 9, wherein the visual effect comprises a shading, an outline, or both.

11. The method of claim 8, comprising the altered digitally stitched image comprises a visual effect applied to the portion of the one or more objects features.

12. The method of claim 8, wherein the data is configured to present the digitally stitched image adjacent to the one or more objects via the electronic display of the computing device.

13. The method of claim 8, wherein comparing the digitally stitched image to the model representative of the property comprises overlaying the digitally stitched image on the model.

14. The method of claim 8, wherein the altered digitally stitched image censors the portion of the one or more objects.

15. The method of claim 14, wherein the portion of the one or more objects comprises a face of the person, an object held by the person, or both.

16. A non-transitory computer-readable medium comprising computer-executable instructions that, when executed by at least one processor, causes the at least one processor to perform operations comprising:
receiving a digitally stitched image representative of at least a portion of a property from a storage component;

receiving a model representative of the property from the storage component;

comparing the digitally stitched image to the model representative of the property to identify one or more objects present in the at least a portion of the property being held by or disposed on a person represented in the digitally stitched image;

sending data comprising the one or more objects to a computing device for presenting via an electronic display;

receiving additional data indicative of a portion of the one or more objects from the computing device;

generating an altered digitally stitched image based on the digitally stitched image and the portion of the one or more objects;

updating the model representative of the property based on the altered digitally stitched image; and sending a notification indicative of the updated model representative of the property to a computing device.

17. The non-transitory computer-readable medium of claim 16, wherein the altered digitally stitched image censors the portion of the one or more objects.

18. The non-transitory computer-readable medium of claim 17, wherein the portion of the one or more objects comprises a face of the person, an object held by the person, an object disposed on the person, or any combination thereof.

19. The non-transitory computer-readable medium of claim 16, wherein the portion of the one or more objects is identified based on a machine learning algorithm configured to monitor one or more patterns of selections related to the one or more objects.

20. The non-transitory computer-readable medium of claim 16, wherein the computer-executable instructions cause the at least one processor to generate an updated insurance policy based on the updated model representative of the property, and wherein the notification is indicative of the updated insurance policy.

* * * * *